United States Patent [19]

Wilderman

[11] 4,202,087
[45] May 13, 1980

[54] DEVICE FOR RETAINING SETTING CABLES

[75] Inventor: Charles L. Wilderman, Grand Island, Nebr.

[73] Assignee: Kelly Well Company, Inc., Grand Island, Nebr.

[21] Appl. No.: 778,912

[22] Filed: Mar. 18, 1977

[51] Int. Cl.² .................. A44B 21/00; E21B 17/14
[52] U.S. Cl. .................... 24/263 R; 166/242
[58] Field of Search .......... 24/263 R, 249 LS, 20 TT, 24/136 R, 115 R; 138/120, 33; 248/74 R, 74 PB, 67.5; 166/235, 242; 403/399, 387, 13, 397

[56] References Cited

U.S. PATENT DOCUMENTS

| 1,697,814 | 1/1929 | Forbes | 85/DIG. 2 |
|---|---|---|---|
| 3,095,041 | 6/1963 | Rasmussen | 166/242 |
| 3,176,364 | 4/1965 | Dritz | 24/204 |
| 3,420,309 | 1/1969 | Beylik | 166/242 |
| 3,757,031 | 9/1973 | Izraeli | 24/263 R |
| 3,856,246 | 12/1974 | Sinko | 24/255 SL |
| 3,897,664 | 8/1975 | Bogese | 24/115 R |
| 4,020,884 | 5/1977 | Jadot | 24/201 C |

FOREIGN PATENT DOCUMENTS

| 221618 | 11/1961 | Austria | 24/263 R |
|---|---|---|---|
| 1300273 | 6/1962 | France | 24/249 LS |

*Primary Examiner*—Francis K. Zugel
*Attorney, Agent, or Firm*—Henderson & Sturm

[57] ABSTRACT

A setting cable retainer device for aligning and securing precast sections in an excavated shaft of a water well or the like, the device having a receiver guide unit secured to or cast in the section and a cable retaining strap which upon proper engagement with the guide unit with a cable therebetween locks thereto to provide an opening through which the cable can slide.

3 Claims, 4 Drawing Figures

DEVICE FOR RETAINING SETTING CABLES

BACKGROUND OF THE INVENTION

This invention relates generally to setting cable retainer devices utilized in various combinations to align and secure concrete tubular sections or the like in vertical position. The sections are used within previously excavated shafts in the ground for the construction of water wells and the like. This device makes the handling, placement, alignment and installation of such tubular sections more efficient, safe and convenient.

It is well known within the art that individual tubular sections of integrally cast concrete can be vertically strung by use of alignment cables. Previously, a concrete tubular section had precast guide holes formed through the section and spaced on either side thereof. Cables would be strung through the guide holes of the tubular sections and the sections would then be lowered and placed in alignment within the well shaft. This process, requiring the stringing of the tubular sections on the cable, proved to be very time consuming as it was necessary to thread the free ends of the cables through the guide holes of each section. Also, the process often resulted in the dropping and possibly the kinking of one or both cables. If the cables were dropped into the shaft the loss of all construction materials within the well shaft could result and if not recovered, the shaft would possibly be abandoned thus requiring a redrilling thereof and a replacement of all lost parts and equipment.

There is consequently a need for an alignment or setting cable retainer device which provides a means for securing tubular sections to cables without requiring the ends of the cable to be freed to facilitate the stringing of the sections thereon and without releasing the tension on the cables already positioned within the well-excavation shaft.

Of the known prior art devices none meet the existing need for a device which is simple to manufacture, compact, inexpensive to maintain, and self-lubricating; which can be made part of a precast section; which provides a guide channel that will not kink or bend the cable during installation; and which is simple to use so that concrete sections can be placed within a shaft with existing equipment. The instant invention is directed to a novel device and method which meets all of these existing needs.

BRIEF SUMMARY OF THE INVENTION

The present invention relates to a setting cable retainer device used in various combinations to align, set and secure tubular concrete sections. The tubular sections are generally cast conduits which are stacked vertically inside an excavated shaft in the construction of a water well.

It is an object of this invention to provide a device for attachment of individual tubular sections to alignment cables without requiring the removal of tension on the cables nor requiring the freeing of the cable ends. This object is accomplished by placing the setting or alignment cables within a groove in a receiver guide unit and then attaching self locking retaining straps units thereby securing the setting cables to the sections to be aligned. Also subsequent installation and finishing processes are less likely to disturb the vertical alignment of the stacked sections because the tension on the cable is maintained during the alignment and installation process.

Another object of the invention is to simply and positively lock alignment cables to sections to be inserted in a well excavation shaft with minimum effort and without the need for special tools.

A further object of the invention is to closely confine the alignment cables so that no kinking, fouling, or binding occurs when sections are installed.

Yet another object of the invention is to place alignment cables within a receiver guide unit precast into concrete sections or by a separate detachable installation, and then positively locking the cables to the sections with a cable retaining strap thus employing a minimum of effort and labor.

One feature of the novel retaining strap and receiver housing combination of this invention is that the insert probes and insert ports thereof are so constructed that spaced teeth are provided to engage when the strap is in place retaining the cable, thus permitting the device to retain the alignment cables without the need to thread the cables through any holes or rings placed into the sections. Another feature of the invention is to make the retainer device out of a plastic material thereby providing self lubrication as well as to simplify the assembly and use thereof.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
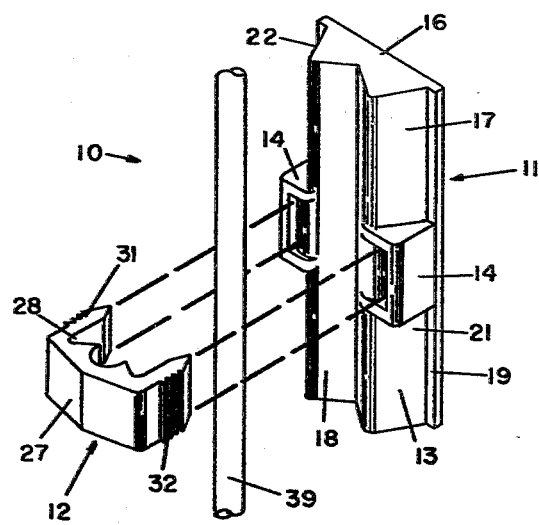
FIG. 1 is a perspective view of the setting cable retainer device.
Figure 2:
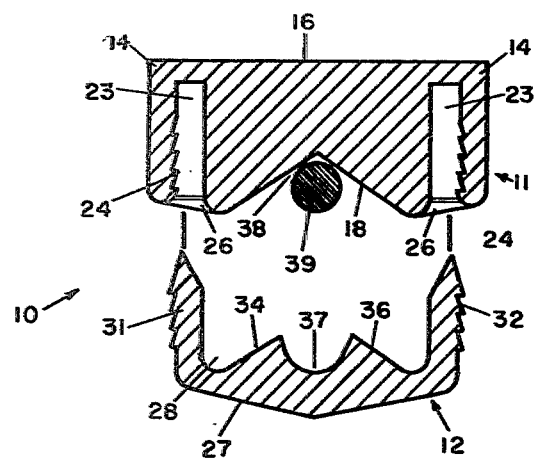
FIG. 2 is an exploded top plan view in section illustrating both components of the invention.

Referring now to the drawing, the setting cable retainer device of this invention is depicted generally by the numeral 10 in FIGS. 1-2. The device includes two components, a receiving guide unit 11 (FIG. 1) and a retaining strap unit 12.

The receiving guide unit 11 (FIGS. 1 and 2) has a base element 13 and two housing elements 14. The base unit 13 has a rectangular shaped base wall 16 and a W-shaped top wall 17, wherein the free ends of the top wall 17 connect with the base wall 16 and the V-shaped groove 18 of the top wall extends longitudinally. Along the line of junction between the base and top walls 16 and 17 on each side of the unit, is a flange 19 which projects laterally thereof. Integral with each outer wall 21 and 22 are the housing elements 14 which projects laterally and outwardly thereof.

Each housing element 14 (FIGS. 1 and 2) is identical, therefore, only one will be described and like reference numbers will identify like parts on the other. A securing unit such as an insert port 23 is formed in the element 14 and one wall 24 of the port 23 is serrated. A thin protective skin 26 or plug covers the opening to the port 23.

The retaining strap unit 12 (FIGS. 1 and 2) includes a body unit 25 having a generally U-shaped outer surface 27 and a modified W-shaped inner surface 28 wherein the free ends of the two surfaces 27 and 28 are connected thus forming prongs 31 and 32 which project outwardly of the body unit 25. The outer surface 27 of each prong 31 and 32 is serrated to coact or lock with the serrated wall 24 when the prongs are inserted into the insert ports 23. The apex (not shown) of the inside walls 34 and 36 of the inner surface 28 is cut out to leave a concave passage 37 which is complimentary to the V-shaped groove 18 of the receiver guide unit 11 to provide an opening 38 between the assembled units 11 and 12 for receiving alignment cable 39.

Figure 3:
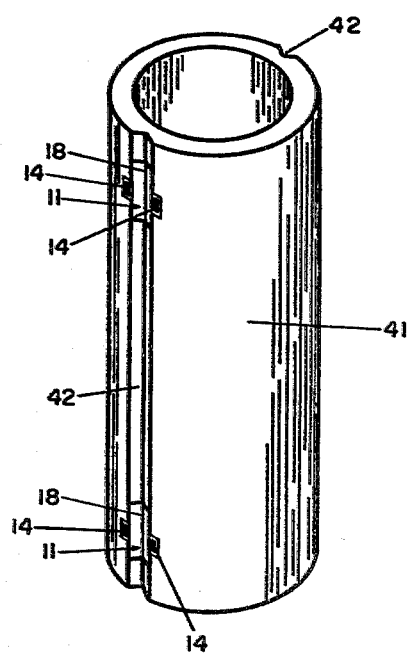
FIG. 3 is a perspective view of the receiver portions of the invention cast within a concrete tubular section.

Referring now to FIG. 3, two spaced receiving guide units 11 are cast in a tubular concrete section 41 or the like. A V-shaped indent 42 is also formed in the section 41 in alignment with the V-shaped grooves 18. Two additional receiving guide units 11 (not shown) are cast and formed 180° from or on the opposite side of the section 41. In this embodiment the section 41 is factory manufactured and shipped to the site of use.

Figure 4:
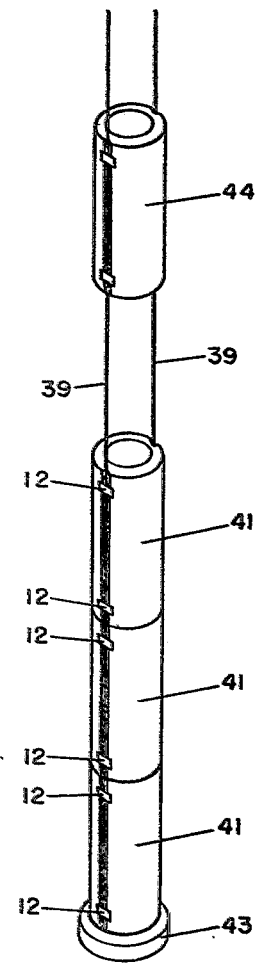
FIG. 4 is a perspective view of the device in use with a plurality of tubular sections.

Three sections 41 (FIG. 4) are vertically aligned on an anchoring column base 43. Secured to the column base 43 are a pair of diametrically opposed, vertically projecting cables 39. Each cable 39 is disposed in the passage 37 formed between the units 11 and 12. A fourth concrete section 44 is being lowered into position by a special setting device (not shown) which is well known in the art.

In order to position and align concrete sections 41 in a well excavation (not shown), it is only necessary to attach the alignment cables 39 to the column base 43 and then lower the base 43 into the excavated shaft. A concrete section 41 is then positioned between the cables 39 at the top of the shaft and the retaining strap units 12 snapped into place by inserting the prongs 31 and 32 into the housing 21 and 22 insert ports 23 by puncturing the skin 26 or by removing the plug. The setting device (not shown) then lowers the section 41 until it rests on the base 43.

The skin 26 or plug is provided over the port 23 opening to prevent the entrance of dirt or foreign matter into the port 23 when it is exposed to the elements. It will be noted that once the prongs 31 and 32 are inserted into the ports 23, the serrated walls 27 of the prongs 31 and 32 lock into the serrated wall 24 of the port 23 and thus are not removable.

The receiver guide unit 11 and the retaining strap unit may be formed from a plastic to provide a self lubricating device to facilitate the sliding contact with the cables.

Although the receiving guide unit 11 (FIG. 3) is described and depicted as being cast into the concrete section 41 it could be attached to the section by wire, threaded devices or the like.

I claim:

1. A setting cable retainer device slidably securing alignment cables to a section used in well excavation shafts, the device comprising:

receiver guide means secured to the section, said guide means including a groove formed therein slidably receiving the cable; and receiver strap means having an outer and an inner surface, said inner surface being generally W-shaped and including a concave passage complimentary to the groove formed in said guide means, the strap means coacting with said receiver guide means slidably securing the cable with the section between said receiver guide means and said retaining strap means, there said receiver guide means including a base element secured to the section and a pair of spaced housings secured to said base element each said housing having a securing means disposed therein for receiving said retaining strap means with the cable disposed between said housings, said base element and said retaining strap means, said securing means being a port formed in said housing and said retaining strap including a body unit means having a pair of spaced prongs projecting therefrom for insertion into said ports, each said port having a locking means formed therein to lock one of said prongs therein, said locking means comprising at least one serrated wall of said port and each said prong having a serrated wall to coact with and lockingly engage said serrated wall of said port.

2. A setting cable retainer device as defined in claim 1 and said base element and said body unit are formed from plastic to provide lubrication.

3. A setting cable retainer device as defined in claim 1 and said ports have a movable plug formed thereover to prevent foreign matter from entering said port.

* * * * *